United States Patent [19]

McNeely et al.

[11] Patent Number: 4,786,963
[45] Date of Patent: Nov. 22, 1988

[54] ADAPTIVE Y/C SEPARATION APPARATUS FOR TV SIGNALS

[75] Inventors: David L. McNeely; Donald H. Willis, both of Indianapolis, Ind.

[73] Assignee: RCA Licensing Corporation, Princeton, N.J.

[21] Appl. No.: 66,671

[22] Filed: Jun. 26, 1987

[51] Int. Cl.$^4$ .............................................. H04N 9/78
[52] U.S. Cl. .......................................................... 358/31
[58] Field of Search ........................................... 358/31

[56] References Cited

U.S. PATENT DOCUMENTS

| | | | |
|---|---|---|---|
| 4,050,084 | 9/1977 | Rossi | 358/31 |
| 4,245,237 | 1/1981 | Lagoni | 358/31 |
| 4,422,094 | 12/1983 | Lewis, Jr. et al. | 358/37 |
| 4,466,016 | 8/1984 | Pritchard | 358/31 |
| 4,524,423 | 6/1985 | Acampora | 364/724 |
| 4,636,840 | 1/1987 | McNeely et al. | 358/31 |

FOREIGN PATENT DOCUMENTS

| | | | |
|---|---|---|---|
| 39184 | 3/1984 | Japan | 358/31 |
| 151592 | 8/1984 | Japan | 358/31 |
| 62292 | 4/1985 | Japan | 358/31 |
| 2488 | 1/1986 | Japan | 358/31 |
| 2054313 | 2/1981 | United Kingdom | 358/31 |
| 2079091 | 1/1982 | United Kingdom | 358/31 |

OTHER PUBLICATIONS

An article entitled "Two Dimensional Digital Decoder for Color Television Signal", presented at ICCE-87 on Jun. 3, 1987 by Nishigori et al.
An article entitled "Cost Effective Hi-Performance Color Television", presented at ICCE-87 on Jun. 4, 1987 by Kingable et al.
An article entitled "Flicker-Free Non-Interlaced Receiving System for Standard Color TV Signals", presented at ICCE-85 on Jun. 7, 1985 by Okada et al.

Primary Examiner—John W. Shepperd
Attorney, Agent, or Firm—Eugene M. Whitacre; Paul J. Rasmussen; Eric P. Herrmann

[57] ABSTRACT

An adaptive luma/chroma separation apparatus is herein disclosed. Means, including delay elements and bandpass filters, are employed to generate a set of three bandpassed signals $B_b$, $M_b$ and $T_b$, which are delayed with respect to each other by one horizontal line period. A control signal generating circuit coupled to receive the three bandpassed signals $B_b$, $M_b$ and $T_b$ develops a control signal K that determines the relative mixing of the signals. A combining circuit, including a soft switch, combines the three bandpassed signals in response to the control signal K to generate a separated chroma signal $C_b$. The separated chroma signal $C_b$ is subtracted from the (non-bandpassed) main signal M to generate the luma signal Y.

9 Claims, 3 Drawing Sheets

ADAPTIVE Y/C SEPARATION APPARATUS FOR TV SIGNALS

This invention relates to an apparatus for separating the luminance and chrominance components Y and C from a composite video signal in a television receiver.

BACKGROUND

In a color television (TV) system (such as NTSC), the luminance and chrominance components ("luma" and "chroma", respectively) of a composite color television signal are disposed within the video frequency spectrum in a frequency interleaved relation, with the luma components at integral multiples of the horizontal line scanning frequency and the chroma components at odd multiples of one-half the line scanning frequency. In the NTSC system, the upper portion (i.e., about 2.1 to 4.2 MHz) of the video frequency spectrum (0 to 4.2 MHz) is shared by chroma components and high frequency luma components. The lower portion (below about 2.1 MHz) of the video frequency spectrum is occupied solely by luma components. Various comb filter arrangements for separating the frequency interleaved luma and chroma components of the video signal are known, for example, U.S. Pat. Nos. 4,143,397 (Holmes) and 4,096,516 (Pritchard).

Comb filters operate on the premise that the composite video signal from horizontal-line-to-horizontal-line or field-to-field or frame-to-frame is highly correlated. When this assumption fails, as it frequently does with program video, certain anomolies occur in the reproduced images. The anomolies result from imperfect cancellation of chroma in the luma output, and vice versa. For example, if there is an abrupt change in the amplitude of chroma between adjacent lines, scintillating serrations will occur along the horizontal edges displayed in the image for a line comb filtered (hereinafter "combed") signal. These serrations (called "hanging dots") are due to incompletely cancelled chroma in the luma channel. Alternatively, if there is an abrupt change in the luma amplitude between horizontal lines, anomalous color saturation effects will be displayed along horizontal edges. Similar undesirable effects occur in the field and frame combed signals.

Adaptive comb filters eliminate some of these artifacts caused by imperfect cancellation of chroma in the luma output, and vice versa. The adaptive comb filters typically use alternate Y/C separation functions (e.g., 1-H line comb, 2-H line comb, etc.) and, for each of these functions, calculate an index of correctness. The Y/C separation function with the best index is selected for generating the combed luma and chroma components. U.S. Pat. Nos. 4,050,084 (Rossi) and 4,636,840 (McNeely et al.) disclose illustrative Y/C separation systems having adaptive features.

In the Rossi's adaptive Y/C separation apparatus, the incoming (or undelayed) composite video signal B is bandpass filtered (hereinafter "bandpassed") to pass a band of frequencies (about 2.1 to 4.2 MHz) including the interleaved chroma components and the high frequency luma components. The bandpassed incoming composite video signal $B_b$ is delayed twice by two, 1-H delay lines to develop a pair of bandpassed, 1-H delayed and 2-H delayed composite video signals $M_b$ and $T_b$ respectively. The capital letters "B", "M" and "T", respectively, stand for the bottom, middle and top horizontal lines of the video signal, and the subscript "b" represents a bandpassed signal.

Rossi uses a plurality of comparators to compare the three bandpassed comosite video signals $B_b$, $M_b$ and $T_b$ (i.e., undelayed, 1-H and 2-H delayed signals, respectively). Depending upon the outcome of the comparison, one of several Y/C separation functions (e.g., 1-H comb, 2-H comb, etc.) is selected to the exclusion of others to develop a bandpassed chroma signal $C_b$.

The incoming composite video signal B is applied to a third 1-H delay line to develop a 1-H delayed (non-bandpassed) composite video signal M. The bandpassed chroma signal $C_b$ is subtracted from the 1-H delayed (non-bandpassed) composite video signal M to generate the luma signal Y, having an uncombed low frequency portion (below 2.1 MHz) and a combined high frequency portion (between 2.1 and 4.2 MHz).

One of the limitations of Rossi is that he employs arbitrary reference values, which makes the effectiveness of his apparatus variable with signal conditions. Another limitation of Rossi is that his decision process compares single samples from each of the lines (to decide which Y/C separation function is best), and is, thus, susceptible to errors due to noise.

Still another limitation is that Rossi uses three (3) 1-H delay lines for generating the four signals ($B_b$, $M_b$ and $T_b$ and M) needed to develop the separated luma and chroma components Y and $C_b$. Delay lines are relatively expensive to implement, both in analog and digital domains (but, particularly, in the digital domain). A further limitation of Rossi is that he uses an "all-or-nothing" selection process. (One of the Y/C separation functions is used to the exclusion of all others.)

The adaptive Y/C separation apparatus disclosed in U.S. Pat. No. 4,636,840 (McNeely et al.) overcomes some of the aforesaid limitations of Rossi. Pairs of composite video signals are developed, which are delayed from each other by an integral number of horizontal line periods (e.g., 1H, 263H, 525H, etc.). Each pair of video signals is used to generate separated luma and chroma components Y and C, and an index ("sum of cross differences") that measures the correctness of the accompanying Y and C components. These measures of correctness are compared. Depending upon the results of comparison, the Y and C components associated with the best measure of correctness are selected for further processing in the TV receiver.

McNeely et al. do not rely on arbitrary reference values, thereby providing a more accurate Y/C separation. Furthermore, McNeely et al. use a pair of samples (instead of a single sample) from each of the lines for calculating cross differences, thereby increasing noise immunity of the selection process. However, McNeely et al. use on "all-or-nothing" selection process similar to Rossi.

Another limitation of McNeely et al. is that their separated luma component is subjected to a "combing" effect over its entire band (0 to 4.2 MHz). The combing action over the high frequency band portion of the video frequency spectrum (which is shared with chroma components) has the desired effect of deleting chroma components from the luma output. Extension of this combing action into the low frequency band portion (which is not shared with the chrominance signal components), however, is not needed to effect the desired removal of chroma components, and serves only to unnecessarily delete luma components. Components in the lower end (e.g., below about 1 MHz) of the unshared band which are subject to such deletion are representative of "vertical detail" luma information. Preservation of such vertical detail is desirable to avoid loss of vertical resolution in the luma content of the displayed image.

SUMMARY OF INVENTION

The present invention discloses an improved Y/C separation apparatus of the adaptive type. The subject apparatus includes means coupled to the incoming composite video signal B for producing (1) a non-bandpassed once-delayed composite video signal M, (2) a bandpassed incoming composite video signal $B_b$, (3) a bandpassed once-delayed composite video signal $M_b$ and (4) a bandpassed twice-delayed composite video signal $T_b$.

A control circuit coupled to receive the three bandpassed composite video signals $B_b$, $M_b$ and $T_b$ provides a signal K for controlling the relative weights assigned to the three bandpassed signals in a manner that reduces cross contamination of the separated components. A combining circuit coupled to receive the respective bandpassed composite video signals $B_b$, $M_b$ and $T_b$ and respoonsive to the control signal K develops a combed chroma signal $C_b$, where:

$$C_b = \tfrac{1}{2} M_b - \tfrac{1}{2}[K \cdot T_b + (1-K) \cdot B_b] \qquad (1)$$

The luma signal Y is derived by subtracting the combed chroma signal $C_b$ from the once-delayed (non-bandpassed) composite video signal M, i.e., $$\begin{aligned} Y &= M - C_b \qquad (2)\\ &= M_1 + M_b - \tfrac{1}{2} M_b + \tfrac{1}{2}[K \cdot T_b + (1-K) \cdot B_b]\\ &= M_1 + \tfrac{1}{2} M_b + \tfrac{1}{2}[K \cdot T_b + (1-K) \cdot B_b], \end{aligned}$$

where the subscript "1" represents low frequency components.

IN THE DRAWINGS

Figures 1, 2:
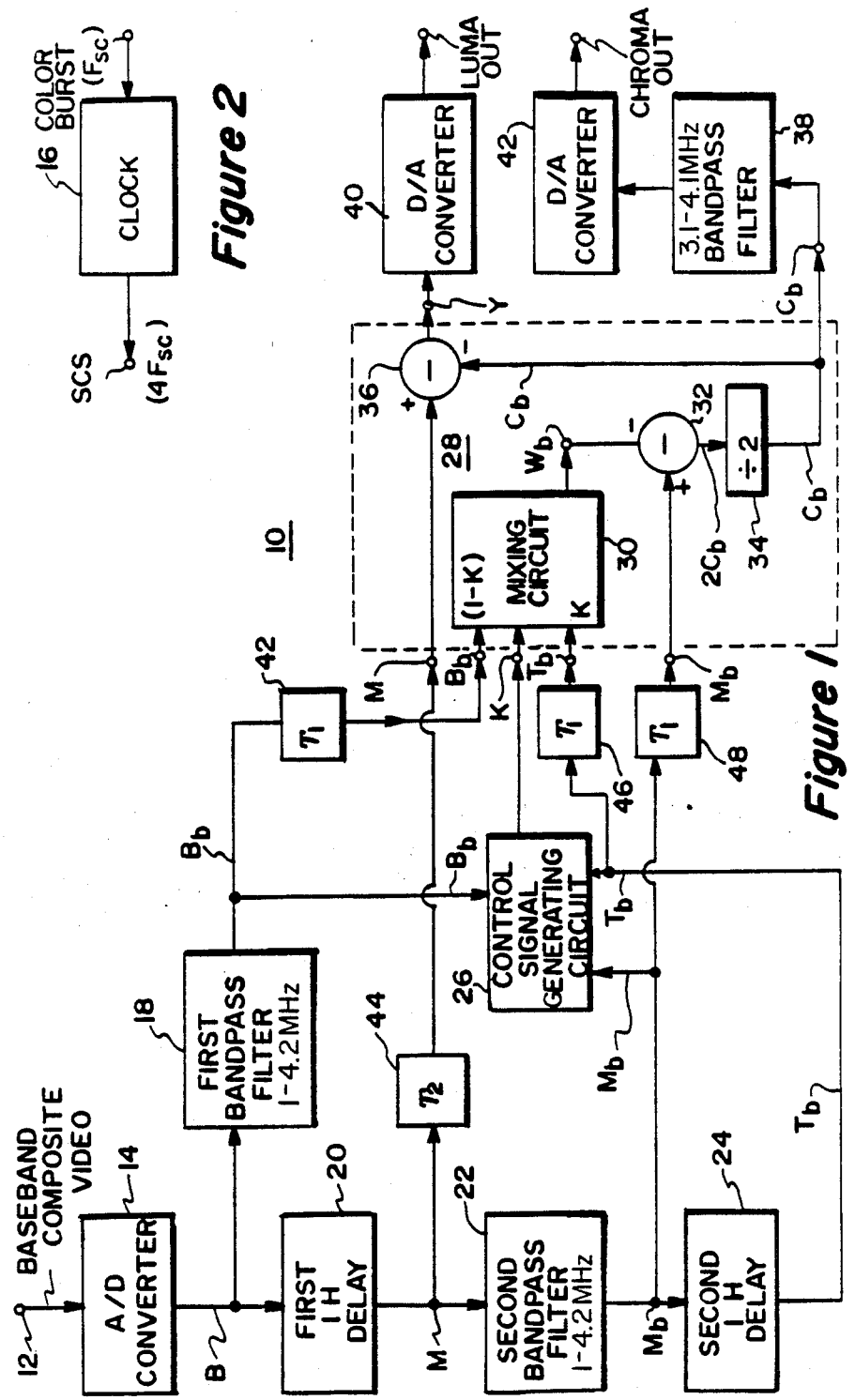
FIG. 1 is a block diagram representation of an adaptive Y/C separation apparatus in accordance with the principles of the present invention.
FIG. 2 shows a circuit, in block form, for generating a sampling clock signal SCS for use in the apparatus of FIG. 1.
Figure 4:
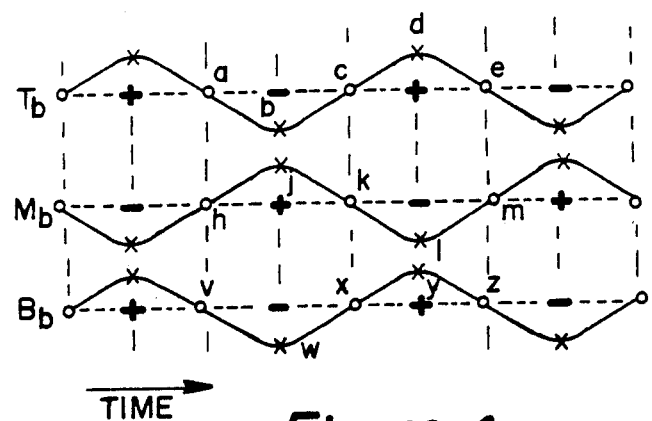
Figure 5:
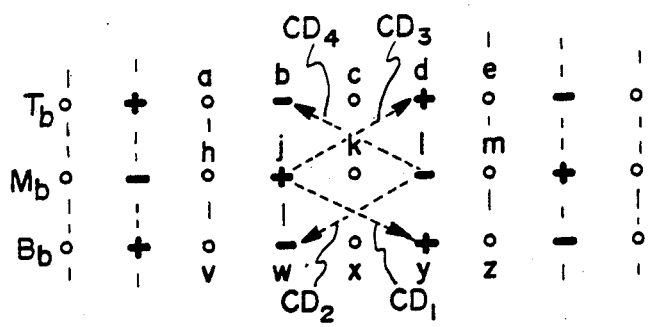
Figure 6:
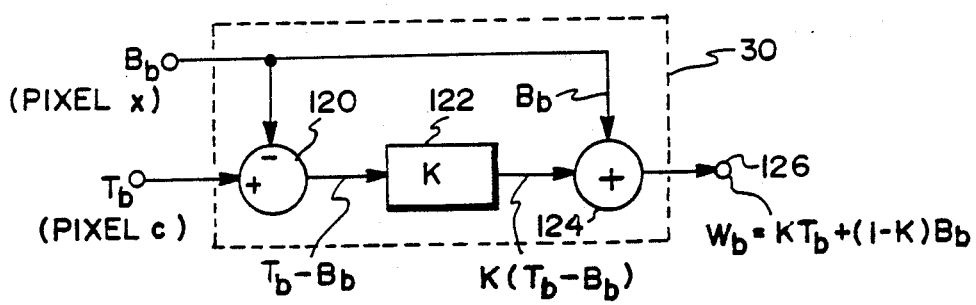

FIGS. 4 and 5 graphically represent diagonally-separated, video signal samples involved in the estimation of the control signal K; and FIG. 6 is a block diagram representation of a mixing circuit responsive to the contrl signal K for use in the FIG. 1 apparatus.

DETAILED DESCRIPTION

In the DRAWINGS, the lines interconnecting various blocks represent either single conductor connections carrying analog signals or multi-conductor buses carrying multi-bit parallel binary digital signals, as the case may be.

It will be readily appreciated by those skilled in the TV signal processing art that the invention may be practiced on either digital or analog representations of the composite video signal. For the purposes of the detailed description, however, it will be assumed herein that the composite video signal is an 8-bit binary digital signal and that the composite video signal is in the NTSC format.

Referring to FIG. 1, an adaptive Y/C separation apparatus, pursuant to the subject invention, is designated by a numeral 10. As shown therein, an incoming or undelayed composite video signal B from the output 12 of a video detector stage (not shown) in the TV receiver is applied to an analog-to-digital (A/D) converter 14. The A/D converter 14 translates the incoming composite video signal B into a digital signal comprising successive 8-bit samples or words in response to a sampling clock signal SCS. As previously indicated, the capital letters "B", "M" and "T" stand for the bottom, middle and the top horizontal video lines as displayed on the kinescope, and the subscript "b" stands for a bandpassed signal.

Figure 3:
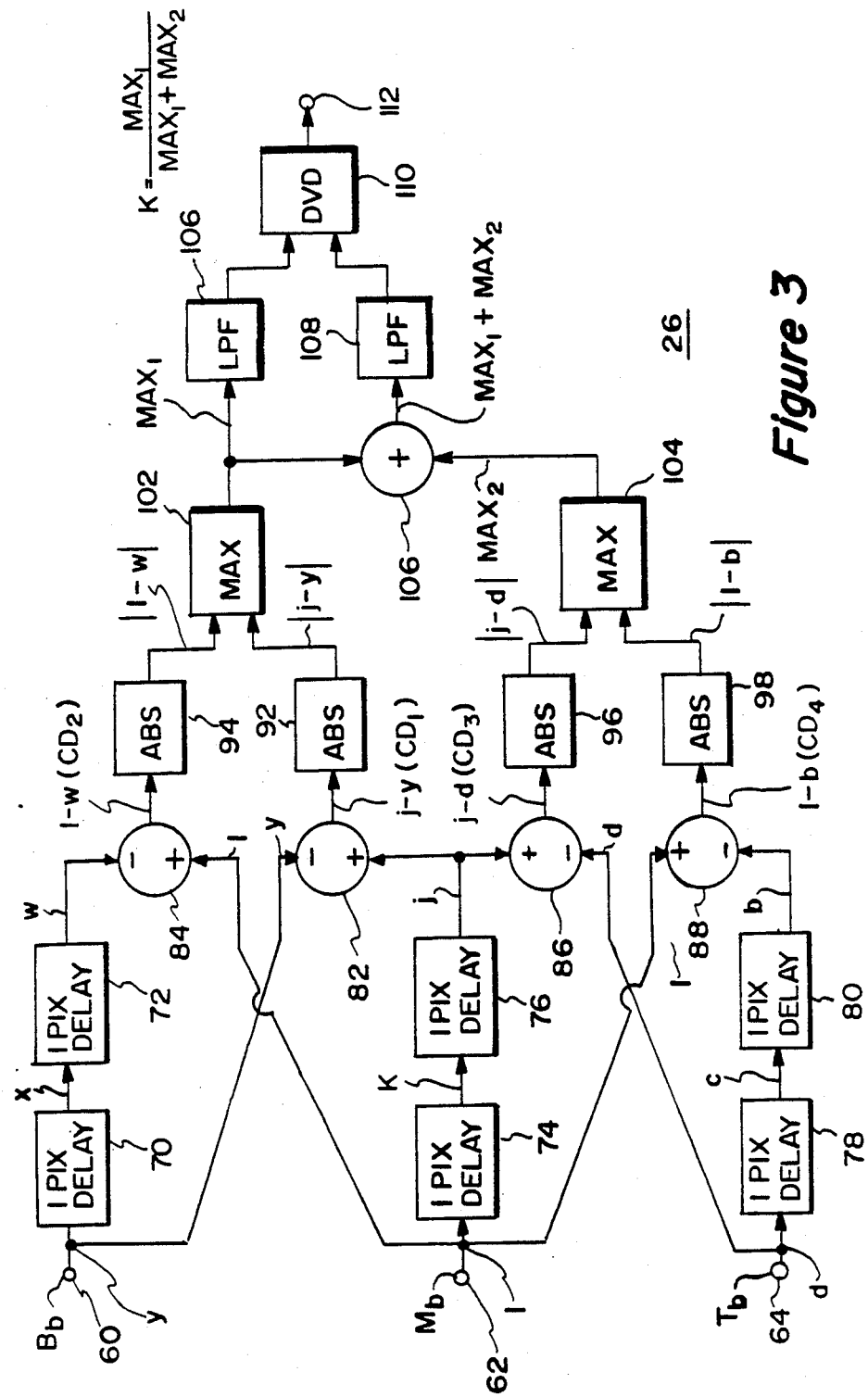
FIG. 3 illustrates, in a block diagram form, the circuit employed for developing a control signal K for use in the FIG. 1 apparatus.

It is assumed herein that the sampling clock signal SCS has a frequency (i.e., about 14.3 MHz) that is four (4) times the frequency $F_{sc}$ (i.e., 3.58 MHz) of the color subcarrier signal CSS (a burst of which is transmitted during the horizontal blanking interval), and is phase locked therewith. In FIG. 2, a functional block 16 represents the clock signal source, which in response to the color subscript signal burst develops the 4 $F_{sc}$, phase-locked sampling clock signal SCS. It will be understood that all the functional elements shown in FIGS. 1, 3 and 6 are timed by the sampling clock signal SCS.

The incoming digital composite video signal B at the output of the A/D converter 14 is applied to a first bandpass filter 18 and a first 1-H delay element 20. The bandpass filter 18 is operative to pass a band of frequencies (e.g., about 1 to 4.2 MHz) including the shared upper region (i.e., about 2.1 to 4.2 MHz) of the video frequency spectrum. The bandpassed incoming composite video signal at the output of the bandpass filter 18 is identified as $B_b$. U.S. Pat. No. 4,524,423 (Acampora) described an illustrative digital bandpass filter circuit.

The 1-H delay element 20 delays the incoming composite video signal B by one horizontal line scanning period to develop a once-delayed (non-bandpassed) composite video signal M. The once-delayed composite video signal M is coupled to a second bandpass filter 22, which has the same passband as the first bandpass filter 18 (i.e., about 1 to 4.2 MHz). The bandpassed once-delayed composite video signal at the output of the second bandpass filter 22 is labeled as $M_b$. A second 1-H delay element 24 delays the bandpassed once-delayed composite video signal $M_b$ by one horizontal line period to produce a bandpassed twice-delayed composite video signal $T_b$.

In the embodiment described herein and shown in FIG. 1, the incoming (non-bandpassed) composite video signal B and the bandpassed once-delayed composite video signal $M_b$ are each delayed by one horizontal line period (1H) by the respective delay elements 20 and 24. Alternately, the video signals B and $M_b$ may be delayed by any suitable integral number of horizontal line periods. For example, for a field comb arrangement, the 1-H delay elements 20 and 24 are replaced by elements that delay the respective input signals by one field period (i.e., 263H). For a frame comb arrangement, the respective signals are delayed by one frame period (i.e., 525H).

It is noted that the first delay element 20 has a passband (e.g., 0 to 4.2 MHz) that allows the incoming non-bandpassed composite video signal B to pass through without significant distortion. On the other hand, the second delay element 24 has a passband (e.g., 1 to 4.2 MHz) that can pass the bandpassed once-delayed composite video signal $M_b$. It means that a simpler, relatively inexpensive configuration may be used for the second delay element 24, vis-a-vis the first delay element 20.

The three bandpassed signals $B_b$, $M_b$ and $T_b$ (i.e., incoming, once-delayed and twice-delayed signals, respectively) are coupled to a control signal generating circuit 26. The circuit 26 develops a signal K that controls the relative mixing of the three bandpassed signals $B_b$, $M_b$ and $T_b$ such that the contamination of the separated chroma signal by the high frequency luma components is held to a minimum. The construction and operation of the control signal generating circuit 26 will be described in detail in conjunction with FIG. 3.

The non-bandpassed once-delayed composite video signal M is coupled to a combining circuit 28 along with the three bandpassed signals $B_b$, $M_b$ and $T_b$. The combining circuit 28, responsive to the mixing control signal K, generates the separated luma and chroma signals Y and $C_b$ in the manner described in detail hereinbelow.

The combining circuit 28 comprises a mixing circuit 30 (also known as a "soft switch"), a subtracter 32, a divider 34 and another subtracter 36. The mixing circuit 30 is coupled to receive the bandpassed incoming and twice delayed composite video signals $B_b$ and $T_b$. Responsive to the control signal K, the mixing circuit 30 develops a weighted bandpassed composite video signal $W_b$, where $$W_b = K \cdot T_b + (1-K) \cdot B_b \qquad (3)$$

The subtracter 32 subtracts the weighted composite video signal $W_b$ from the bandpassed once-delayed composite video signal $M_b$ to develop an output signal, which is divided by a factor of 2 to generate a normalized chroma signal $C_b$. (See EQUATION 1.)

The second subtracter 36 subtracts from the non-bandpassed once-delayed composite video signal M the bandpassed chroma signal $C_b$ to produce the separated luma signal Y. (See EQUATION 2.) The combined chroma signal $C_b$ is applied to a third bandpass filter 38 to further limit the frequencies in the chroma channel to a range extending from about 3.1 to 4.1 MHz (i.e., about 3.58±0.5 MHz). Digital-to-analog (D/A) converters 40 and 42, responsive to the clock signal SCS, translate the digital luma and chroma signals into their analog counterparts for further processing.

It is noted from EQUATION 2 that the separated luma signal Y is combed only in the upper region (i.e., about 1.0 to 4.2 MHz) of the video frequency spectrum where the high frequency luma and chroma components are interleaved. The luma signal Y is, however, left intact (i.e., not combed) in the lower frequency region (e.g., below 1.0 MHz) where only the vertical detail is present.

In the FIG. 1 apparatus, appropriate matching delays 42, 44, 46 and 48 are inserted to compensate for the delay variations in the different signal paths.

The principles underlying the generation of the mixing control signal K will be first explained with reference to FIGS. 4 and 5. The actual circuit for producing the mixing control signal K will be later described with reference to FIG. 3.

FIG. 4 represents a waveform diagram of portions of three horizontal lines, which are separated by an integral number of horizontal line periods (i.e., 1H, 263H, 525H, etc.). If an interline comb filter is employed for separating the luma and chroma signals Y and $C_b$, the three lines are three successive horizontal lines in one image field. If an interfield comb filter is used the three lines are separated by 263 horizontal lines. In an interframe comb filter, the three lines are separated by 525 horizontal lines.

The video signal is drawn as a sinusoid to represent the relative phase of a chroma signal (of a particular color) between lines. The signal is assumed to be sampled at four times the chroma subcarrier rate with representative sampling points designated +, 0, −, 0, +, etc. The (±) points designate sampling instants at the positive and negative phase excursions of the chroma signal. The 0 points designate sampling points at the zero crossings. However, the 0 sampling points do not necessarily have zero values since the composite video signal is the sum of chroma and luma signals. Nor is it necessary that sampling be performed at the phases shown. FIG. 5 corresponds to FIG. 4 with the waveforms eliminated for purposes of clarity. In both FIGS. 4 and 5, the small letters a,b,c,d,e ... h,j,k,l,m ... and v,w,x,y and z represent the intensity (or amplitude) values of the picture elements (or pixels) from the three lines designated as $T_b$, $M_b$ and $B_b$ (i.e., twice delayed, once delayed and undelayed video signals, respectively).

In the comb filtering process, the horizontal lines with antiphase chroma are subtractively combined to produce the separated chroma signal C (with energy concentrated at odd multiples of one-half the horizontal line scanning frequency). If the amplitude of the luma signal Y is identical between the lines combined, the luma signal is completely cancelled by the subtraction process. However, if the amplitude of the luma signal differs between lines, the amount of cancellation of the undesired luma signal Y in the separated chroma signal $C_b$ is incomplete.

An estimation of how much weight is to be given to the pixels from each of the lines is determined by a comparison process. This is done by calculating a first pair of cross differences $CD_1$ and $CD_2$ using a set of four pixels (i.e., pixels j,y and l,w) from the two lines defined by the bandpassed undelayed and once-delayed video signals $B_b$ and $M_b$. The pixel pairs j,y and l,w have like sampling phases (e.g., both positive or negative phases with respect to the color subcarrier) and are disposed symmetrically on the opposite sides (i.e., left and right) of the pixel of interest (i.e., k). EQUATIONS for $CD_1$ and $CD_2$ are:

$$CD_1 = j - y \qquad (4)$$

$$CD_2 = l - w \qquad (5)$$

A second pair of symmetrically-disposed cross differences $CD_3$ and $CD_4$ is determined similarly by using another set of four pixels (i.e., l,b and j,d) from the two lines formed by the bandpassed once-delayed and twice-delayed video signals $M_b$ and $T_b$, respectively. EQUATIONS for $CD_3$ and $CD_4$ are:

$$CD_3 = j - d \qquad (6)$$

$$CD_4 = l - b \qquad (7)$$

To calculate the control signal K, the absolute values of the first pair of cross differences $CD_1$ and $CD_2$ are determined, and the maximum value $MAX_1$ between the two is established. Thus, $$MAX_1 = MAX \cdot (|CD_1|, |CD_2|) \quad (8)$$

Similarly, another maximum value $MAX_2$ is computed as follows:

$$MAX_2 = MAX \cdot (|CD_3|, |CD_4|) \quad (9)$$

The control signal quotient $K_q$ is determined from the following EQUATION:

$$K_q = \frac{MAX_1}{MAX_1 + MAX_2} \quad (10)$$

If $MAX_1$ and $MAX_2$ are both equal to zero, then $K_q$ is set equal to ½.

The quotient $K_q$ is then quantized into 33 different levels (i.e., 32 steps) to define the digital control signal K applied to the mixing circuit or soft switch 30, as indicated above.

The mixing circuit 30 is so arranged that the larger the control signal K the higher the weight given to the pixel c from the top line $T_b$. Thus, if $MAX_1 >> MAX_2$, the pixel c from the top line $T_h$ will be given the weight of one and the pixel x from the bottom line $B_b$ will be given the weight of zero. At the other extreme, if $MAX_1 << MAX_2$, the pixel c will be the weight of zero and the pixel x will be given the weight of one.

Because the estimation signal is determined with reference to two groups of four samples each (e.g., j,y,1,w and j,d,1,b), its sensitivity to noise is reduced with respect to a two sample estimate. Conversely, it is more sensitive to the occurrence of diagonal images, and, therefore, it produces more desirable responses along reproduced diagonal lines.

The operation of the control signal generating circuit 26 will now be explained in conjunction with FIG. 3. A first set of pixels y, 1 and d representative of the signals $B_b$, $M_b$ and $T_b$ respectively appear at the input terminals 60, 62 and 64 of the circuit 26. The terminals 60, 62 and 64 are coupled to the respective connections in FIG. 1. A second set of pixels w, j and b representative of 2-pixel delayed versions of the respective signals $B_b$, $M_b$ and $T_b$ appear at the outputs of the second 1-pixel delay elements 72, 76 and 80. Subtracters 82, 84, 86 and 88 calculate the respective cross differences $CD_1$ (j−y), $CD_2$ (1−w), $CD_3$ (j−d) and $CD_4$ (1−b). The four cross differences $CD_1$, $CD_2$, $CD_3$ and $CD_4$ are applied to the circuit elements 92, 94, 96 and 98 to determine their respective absolute values.

The circuit elements 102 and 104 coupled to receive the respective pairs of absolute values $|j-y|$, $|1-w|$ and $|j-d|$, $|1-b|$ determine the two maximum values $MAX_1$ and $MAX_2$ as follows:

$$MAX_1 = MAX \cdot (|j-y|, |1-w|) \quad (11)$$

$$MAX_2 = MAX \cdot (|j-d|, |1-b|) \quad (12)$$

An adder 106 adds the two maximum values $MAX_1$ and $MAX_2$ to form the denominator of the quotient $K_q$. The value $MAX_1$ (which defines the numerator of the quotient $K_q$) and the sum $MAX_1 + MAX_2$ are passed through respective lowpass filters 106 and 108 to eliminate high frequency variations. The transfer function TF for the two lowpass filters 106 and 108 is identical and is given by the following EQUATION:

$$TF = \tfrac{1}{8}(1+Z^{-1})(1+Z^{-2})(1+Z^{-3}), \quad (13)$$

where $Z^{-1}$, $Z^{-2}$ and $Z^{-3}$ represent one, two and three pixel delays and Z is the conventional Z-transform variable.

The outputs of the two lowpass filters 106 and 108 are applied to a divider 110, which develops the quotient $K_q$. This quotient $K_q$ is then quantized into 33 different levels (32 steps) and made available as the control signal K at an output terminal 112 for application to the soft switch 30.

FIG. 6 is a schematic block diagram representation of the mixing circuit 30. The output $T_b - B_b$ of a subtracter 120 is multiplied by the factor K in a multiplier 122. An adder 124 combines the output $K \cdot (T_b - B_b)$ of the multiplier 122 with the signal $B_b$ to produce the weighted video signal $W_b$ at an output terminal 126, where:

$$W_b = K \cdot T_b + (1-K) \cdot B_b \quad (14)$$

The weighted video signal $W_b$ is subtracted from the bandpassed once-delayed video signal $M_b$, and the resulting signal is divided by a factor of 2 to produce the bandpassed chroma signal $C_b$ as previously described. (See EQUATION 1.)

The disclosed and claimed apparatus is applicable to PAL systems. The difference between the NTSC system and PAL system is that the lines of video to be combined in the PAL system to generate combed signals must be separated an integral multiple of two lines. For a line comb filter, the appropriate video signal lines employed in the PAL system are lines $n-2$, n and $n+2$.

In the following claims the term "cross difference" is defined as the difference (e.g., j−y) between diagonally separated samples (e.g., j and y) from different video lines (e.g., line $M_b$ and $B_b$) separated by an integral number (e.g., 1H) of horizontal lines, and disposed on the opposite sides of the sample of interest (e.g., k). The samples (e.g., j and y) from which the cross difference (e.g., $CD_1$) is developed are disposed on either side (i.e., left and right) of the pixel (e.g., k) for which separated luma and chroma signals Y and C are currently being developed.

While a particular embodiment of the present invention has been shown and described in detail, adaptations and modifications will be apparent to one skilled in the art. Such adaptations and modifications of the invention may be made without departing from the spirit and scope thereof, as set forth in the following claims.

What is claimed is:

1. In a color television system subject to reception of an incoming composite video signal B consisting of digital samples occurring synchronously with a sampling clock signal SCS; said composite video signal having given horizontal line scanning frequency ($f_H$), and being inclusive of a luminance component Y and a modulated subcarrier chrominance component C sharing an upper region of the video frequency spectrum in a frequency-interleaved relationship; an apparatus for separating said luminance and chrominance Y and C of said composite video signal comprising:

means coupled to receive said incoming composite video signal B for producing the following signals:
    a non-bandpassed once-delayed composite video signal M;

a bandpassed incoming composite video signal $B_b$;
a bandpassed once-delayed composite video signal $M_b$; and
a bandpassed twice-delayed composite video signal $T_b$;

means coupled to receive said bandpassed incoming and once-delayed composite video signals $B_b$ and $M_b$ for determining a first pair of cross differences $CD_1$ and $C_2$ between pairs of diagonally separated digital samples having like sampling phases and being symmetrically disposed on the opposite sides of a sample of interest;

means coupled to receive said bandpassed once-delayed and twice-delayed composite video signals $M_b$ and $T_b$ for determining a second pair of cross differences $CD_3$ and $CD_4$ between pairs of diagonally separated samples having like sampling phases and being symmetrically disposed on the opposite sides of said sample of interest; and means coupled to receive said first pair of cross differences $CD_1$ and $CD_2$ for determining their respective absolute values $|CD_1|$ and $|CD_2|$;

means cpoupled to receive said absolute values $|CD_1|$ and $|CD_2|$ of said first pair of cross differences $CD_1$ and $CD_2$ for determining the maximum absolute value $MAX_1$ thereof;

means coupled to receive said second pair of cross differences $CD_3$ and $CD_4$ for determining their respective absolute values $|CD_3|$ and $|CD_4|$;

means coupled to receive said absolute values $|CD_3|$ and $|CD_4|$ of said second pair of cross differences $CD_3$ and $CD_4$ for determining the maximum absolute value $MAX_2$ thereof;

means for producing a signal K to control the relative mixing of said bandpassed composite video signals $B_b$, $M_b$ and $T_b$ by dividing one of said maximum absolute values $MAX_1$ and $MAX_2$ by the sum $(MAX_1+MAX_2)$ thereof; and combining means coupled to receive said non-bandpassed once-delayed composite video signal M and said bandpassed incoming, once-delayed and twice-delayed composite video signals $B_b$, $M_b$ and $T_b$ and responsive to said control signal K for generating at least one separated component signal.

2. Apparatus defined in claim 1 wherein said combining means comprises:
mixing means coupled to receive said bandpassed incoming and twice-delayed composite video signals $B_b$ and $T_b$ and responsive to said control signal K for producing a bandpassed weighted composite video signal $W_b$, where $$W_b = K \cdot (T_b) + (1-K) \cdot (B_b); \text{ and}$$

means for subtractively combining said bandpassed once-delayed composite video signal $M_b$ and said bandpassed weighted composite video signal $W_b$ for generating a bandpassed chrominance component representative signal $2C_b$, where:

$$2C_b = M_b - W_b.$$

3. Apparatus defined in claim 2 wherein said combining means further includes means for dividing the output of said subtractively combining means by a factor of two to generate a normalized chrominance component signal $C_b$.

4. Apparatus defined in claim 3 wherein said combining means additionally includes means for subtractively combining said non-bandpassed once-delayed composite video signal M and said bandpassed chrominance component $C_b$ to generate said luminance component Y, where $$Y = M - C_b.$$

5. Video signal processing apparatus comprising:
an input terminal for applying said video signal;
means coupled to said input terminal for producing a plurality of video signals respectively delayed by integral numbers of a horizontal line interval;
means, coupled to said means for producing said plurality of video signals, for forming pairs of cross differences from pairs of said plurality of video signals;
means for providing, in accordance with a predetermined relative magnitude function of the cross differences of each pair of cross differences, the magnitude of one cross difference from each pair; and
means for combining ones of said plurality of video signals in proportions determined by the quotient of one of said provided magnitudes over the sum of said provided magnitudes.

6. Video signal processing circuitry for processing a video signal occurring as a sequence of horizontal lines, said circuitry comprising:
a video signal input terminal for receiving said video signal;
means coupled to said video signal input terminal for providing first, second and third video signals, said third video signal being delayed relative to said second video signal by substantially an integral number of line intervals and said second video signal being delayed relative to said first video signal by substantially an integral number of line intervals;
means, coupled to receive said second and third video signals, for providing a first pair of cross differences $CD_1$ and $CD_2$ from diagonally disposed signal samples from two horizontal lines;
means, coupled to receive said first and second video signals, for providing a second pair of cross differences $CD_3$ and $CD_4$ from diagonally disposed signal samples from two horizontal lines;
means, coupled to receive said first and second pair of cross differences, for providing the magnitude value, $MAX_1$, of the cross difference $CD_1$ or $CD_2$ having the larger magnitude; and the magnitude value, $MAX_2$, of the cross difference $CD_3$ or $CD_4$ having the larger magnitude;
combining means, coupled to receive said first and second and third video signals, for combining said first, second and third video signals substantially in the ratio $$\frac{-MAX_2}{MAX_1+MAX_2} : 1 : \frac{-MAX_1}{MAX_1+MAX_2}.$$

7. The video signal processing circuitry set forth in claim 6 wherein said means for providing cross differences comprises:
delay means, coupled for receiving said first, second and third video signals, for providing a matrix of pixel values corresponding to vertically aligned pixels from first, second and third horizontal lines of video signal;

first combining means coupled to said delay means, for providing the cross difference, $CD_1$, of two pixel values, disposed in a first diagonal direction, from said first and second horizontal lines;

second combining means coupled to said delay means, for providing the cross difference, $CD_2$, of two pixel values, disposed in a second diagonal direction; from said first and second horizontal lines;

third combining means coupled to said delay means, for providing the cross difference, $CD_3$, of two pixel values, disposed in said first diagonal direction, from said second and third horizontal lines;

fourth combining means coupled to said delay means, for providing the cross difference, $CD_4$, of two pixel values, disposed in said second diagonal direction, from said second and third horizontal lines.

8. The video signal processing circuitry set forth in claim 7 wherein the means for providing magnitude values $MAX_1$ and $MAX_2$ comprises:

first and second magnitude detectors, coupled respectively to said first and second combining means, for providing the magnitudes $|CD_1|$ and $|CD_2|$ of the cross differences $CD_1$ and $CD_2$;

third and fourth magnitude detectors, coupled respectively to said third and fourth combining means, for providing the magnitudes $|CD_3|$ and $|CD_4|$ of the cross differences $CD_3$ and $CD_4$;

a first maximum detector, coupled to said first and second magnitude detectors, for providing the greater valued one of magnitudes $|CD_1|$ and $|CD_2|$;

a second maximum detector, coupled to said third and fourth magnitude detectors, for providing the greater valued one of magnitudes $|CD_3|$ and $|CD_4|$.

9. The video signal processing circuitry set forth in claim 6 wherein said combining means comprises:

means, coupled to the means for providing the magnitude values $MAX_1$ and $MAX_2$, for developing a control signal k substantially equal to the quotient of one of the magnitude values $MAX_1$ and $MAX_2$ divided by the sum of $MAX_1$ and $MAX_2$;

means coupled to receive said first and third video signals for combining said first and second video signals in the ratio k: $(1-k)$, to produce the combined signal $S_c$;

means coupled to receive said third video signal and said combined signal for combining said second video signal and said combined signal $S_c$ in the ratio $1: -1$.

* * * * *